United States Patent
Xu et al.

(10) Patent No.: US 10,154,285 B2
(45) Date of Patent: Dec. 11, 2018

(54) VIDEO CODING SYSTEM WITH SEARCH RANGE AND METHOD OF OPERATION THEREOF

(71) Applicant: SONY CORPORATION, Tokyo (JP)

(72) Inventors: Jun Xu, Cupertino, CA (US); Ali Tabatabai, Cupertino, CA (US); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/952,986

(22) Filed: Apr. 13, 2018

(65) Prior Publication Data

US 2018/0234699 A1 Aug. 16, 2018

Related U.S. Application Data

(63) Continuation of application No. 14/339,324, filed on Jul. 23, 2014, now Pat. No. 10,009,629.

(60) Provisional application No. 61/889,832, filed on Oct. 11, 2013.

(51) Int. Cl.
| | |
|---|---|
| *H04N 19/593* | (2014.01) |
| *H04N 19/57* | (2014.01) |
| *H04N 19/436* | (2014.01) |
| *H04N 19/70* | (2014.01) |

(52) U.S. Cl.
CPC ........... *H04N 19/593* (2014.11); *H04N 19/57* (2014.11); *H04N 19/436* (2014.11); *H04N 19/70* (2014.11)

(58) Field of Classification Search
CPC .................................................. H04N 19/593
See application file for complete search history.

(56) References Cited

U.S. PATENT DOCUMENTS

| | | |
|---|---|---|
| 8,494,042 B2 | 7/2013 | Park et al. |
| 2011/0261882 A1 | 10/2011 | Zheng et al. |
| 2012/0287995 A1 | 11/2012 | Budagavi |
| 2013/0114697 A1 | 5/2013 | Siddaramanna et al. |
| 2013/0177082 A1 | 7/2013 | Sugio et al. |
| 2013/0301719 A1 | 11/2013 | Sasai et al. |
| 2013/0336394 A1 | 12/2013 | Tu et al. |
| 2014/0044171 A1 | 2/2014 | Takehara et al. |
| 2014/0334542 A1 | 11/2014 | Lee et al. |

(Continued)

OTHER PUBLICATIONS

Flynn, et al., "High Efficiency Video Coding (HEVC) Range Extensions text specification: Draft 4", JCTVC-N1005 v3, Joint Collaborative Team on Video Coding (JCT-VC) of ITU-T SG16 WP 3 and ISO/IEC JTC 1/SC 29/WG 11, vol. 3, Aug. 8, 2013, 322 pages.

(Continued)

*Primary Examiner* — James M Pontius
(74) *Attorney, Agent, or Firm* — Chip Law Group

(57) ABSTRACT

A video coding system, and a method of operation thereof, includes: a source input module for receiving a frame from a video source; and a picture process module, coupled to the source input module, for generating a reference coding unit in the frame; for generating an intra copy motion vector pointing to the reference coding unit within a search range, wherein the search range does not include an upper coding tree unit of the frame; for generating a current coding unit based on the intra copy motion vector; and for generating a video bitstream based on the current coding unit for a video decoder to receive and decode for displaying on a device.

8 Claims, 9 Drawing Sheets

(56) References Cited

U.S. PATENT DOCUMENTS

2015/0049813 A1\* 2/2015 Tabatabai ............ H04N 19/513
 375/240.16
2015/0103914 A1 4/2015 Xu et al.

OTHER PUBLICATIONS

Saxena, et al., "HEVC Range Extensions Core Experiment 3 (RCE3): Intra Prediction techniques", JCTVC-N1123 v3, Joint Collaborative ream on Video Coding (JCTVC) of ITU-T SG 16 WP 3 and ISO/IEC JTC 1/SC 29/WG 11, vol. 3, Aug. 8, 2013, pp. 1-6.
Xu, et al., "On intra block copying in RExt, JCTVC-Oxxxx", Input Document to JCT-VC, Joint Collaborative Team on Video Coding (JCT-VC) of ITU-T SG 16 WP 3 and ISO/IEC JTC 1/SC 297WG 11, 15th Meeting, Oct. 2013, pp. 1-8.
Non-Final Office Action for U.S. Appl. No. 14/339,324, dated Apr. 6, 2017, 14 pages.
Final Office Action for U.S. Appl. No. 14/339,324, dated Oct. 19, 2017, 10 pages.
Advisory Action for U.S. Appl. No. 14/339,324, dated Dec. 28, 2017, 3 pages.
Notice of Allowance for U.S. Appl. No. 14/339,324, dated Mar. 1, 2018, 8 pages.

\* cited by examiner

VIDEO CODING SYSTEM WITH SEARCH RANGE AND METHOD OF OPERATION THEREOF

CROSS REFERENCE TO RELATED APPLICATIONS

The present application is a continuation application of U.S. patent application Ser. No. 14/339,324, filed on Jul. 23, 2014, which claims the benefit of U.S. Provisional Patent Ser. No. 61/889,832 filed on Oct. 11, 2013. Each of the above-referenced applications is hereby incorporated herein by reference in its entirety.

The present application contains subject matter related to a concurrently filed U.S. Patent Application by Jun Xu, Ali Tabatabai and Ohji Nakagami entitled "VIDEO CODING SYSTEM WITH INTRA PREDICTION MECHANISM AND METHOD OF OPERATION THEREOF". The related application is assigned to Sony Corporation and is identified by U.S. patent application No. 14/339,309. The subject matter thereof is incorporated herein by reference thereto.

TECHNICAL FIELD

The present invention relates generally to video systems, and more particularly to a system for video coding with intra prediction.

BACKGROUND ART

The deployment of high quality video to smart phones, high definition televisions, automotive information systems, and other video devices with screens has grown tremendously in recent years. The wide variety of information devices supporting video content requires multiple types of video content to be provided to devices with different size, quality, and connectivity capabilities.

Video has evolved from two dimensional single view video to multiview video with high-resolution three-dimensional imagery. In order to make the transfer of video more efficient, different video coding and compression schemes have tried to get the best picture from the least amount of data. The Moving Pictures Experts Group (MPEG) developed standards to allow good video quality based on a standardized data sequence and algorithm. The H.264 (MPEG4 Part 10)/Advanced Video Coding design was an improvement in coding efficiency typically by a factor of two over the prior MPEG-2 format. The quality of the video is dependent upon the manipulation and compression of the data in the video. The video can be modified to accommodate the varying bandwidths used to send the video to the display devices with different resolutions and feature sets. However, distributing larger, higher quality video, or more complex video functionality requires additional bandwidth and improved video compression.

Thus, a need still remains for a video coding system that can deliver good picture quality and features across a wide range of device with different sizes, resolutions, and connectivity. In view of the increasing demand for providing video on the growing spectrum of intelligent devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a video coding system including: receiving a frame from a video source; generating a reference coding unit in the frame; generating an intra copy motion vector pointing to the reference coding unit within a search range, wherein the search range does not include an upper coding tree unit of the frame; generating a current coding unit based on the intra copy motion vector; and generating a video bitstream based on the current coding unit for a video decoder to receive and decode for displaying on a device.

The present invention provides a video coding system, including: a source input module for receiving a frame from a video source; and a picture process module, coupled to the source input module, for generating a reference coding unit in the frame; for generating an intra copy motion vector pointing to the reference coding unit within a search range, wherein the search range does not include an upper coding tree unit of the frame; for generating a current coding unit based on the intra copy motion vector; and for generating a video bitstream based on the current coding unit for a video decoder to receive and decode for displaying on a device.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
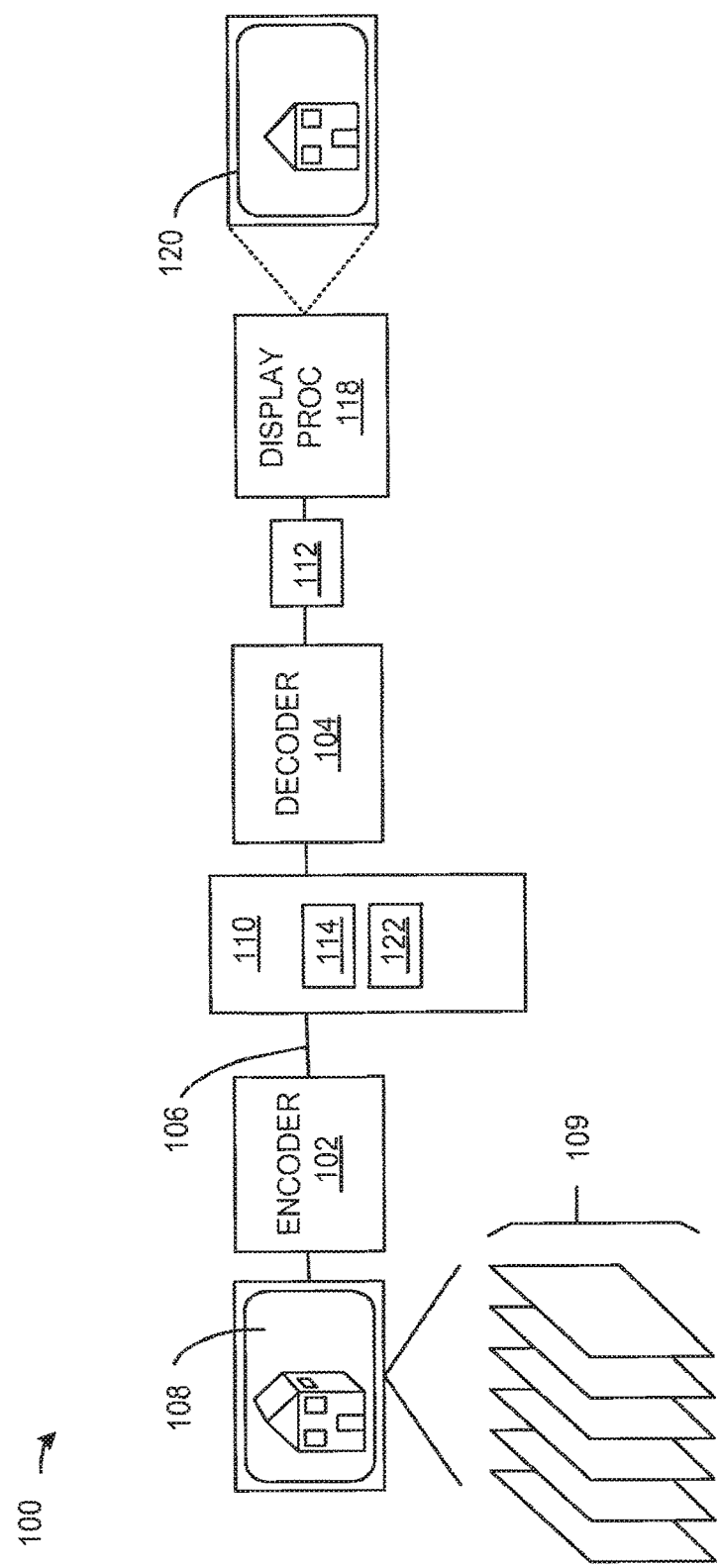
FIG. 1 is a block diagram of a video coding system in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

The term "syntax" means the set of elements describing a data structure. The term "block" referred to herein means a group of picture elements, pixels, or smallest addressable elements in a display device.

Referring now to FIG. 1, therein is shown a block diagram of a video coding system 100 in an embodiment of the present invention. The video coding system 100 can encode and decode video information. A video encoder 102 can receive a video source 108 and send a video bitstream 110 to a video decoder 104 for decoding and display on a display interface 120.

The video encoder 102 can receive and encode the video source 108. The video encoder 102 is a unit for encoding the video source 108 into a different form. The video source 108 is defined as a digital representation of a scene of objects.

Encoding is defined as computationally modifying the video source 108 to a different form. For example, encoding can compress the video source 108 into the video bitstream 110 to reduce the amount of data needed to transmit the video bitstream 110.

In another example, the video source 108 can be encoded by being compressed, visually enhanced, separated into one or more views, changed in resolution, changed in aspect ratio, or a combination thereof. In another illustrative example, the video source 108 can be encoded according to the High-Efficiency Video Coding (HEVC)/H.265 standard. In yet another illustrative example, the video source 108 can be further encoded to increase spatial scalability.

The video source 108 can include frames 109. The frames 109 are individual images that form the video source 108. For example, the video source 108 can be the digital output of one or more digital video cameras taking 24 of the frames 109 per second.

The video encoder 102 can encode the video source 108 to form the video bitstream 110. The video bitstream 110 is defined a sequence of bits representing information associated with the video source 108. For example, the video bitstream 110 can be a bit sequence representing a compression of the video source 108.

In an illustrative example, the video bitstream 110 can be a serial bitstream sent from the video encoder 102 to the video decoder 104. In another illustrative example, the video bitstream 110 can be a data file stored on a storage device and retrieved for use by the video decoder 104.

The video encoder 102 can receive the video source 108 for a scene in a variety of ways. For example, the video source 108 representing objects in the real-world can be captured with a video camera, multiple cameras, generated with a computer, provided as a file, or a combination thereof.

The video source 108 can include a variety of video features. For example, the video source 108 can include single view video, multiview video, stereoscopic video, or a combination thereof.

The video encoder 102 can encode the video source 108 using a video syntax 114 to generate the video bitstream 110. The video syntax 114 is defined as a set of information elements that describe a coding system for encoding and decoding the video source 108. The video bitstream 110 is compliant with the video syntax 114, such as High-Efficiency Video Coding/H.265, and can include a HEVC video bitstream, an Ultra High Definition video bitstream, or a combination thereof. The video bitstream 110 can include the video syntax 114.

The video bitstream 110 can include information representing the imagery of the video source 108 and the associated control information related to the encoding of the video source 108. For example, the video bitstream 110 can include an occurrence of the video syntax 114 having a representation of the video source 108.

The video encoder 102 can encode the video source 108 to form a video layer 122. The video layer 122 is a representation of the video source 108. For example, the video layer 122 can include the video source 108 at a different resolution, quality, bit rate, frame rate, or a combination thereof. The video layer 122 can be a lower resolution representation of the video source 108. In another example, the video layer 122 can be a high efficiency video coding (HEVC) representation of the video source 108. In yet another example, the video layer 122 can be a representation of the video source 108 configured for a smart phone display.

The video coding system 100 can include the video decoder 104 for decoding the video bitstream 110. The video decoder 104 is defined as a unit for receiving the video bitstream 110 and modifying the video bitstream 110 to form a video stream 112.

The video decoder 104 can decode the video bitstream 110 to form the video stream 112 using the video syntax 114. Decoding is defined as computationally modifying the video bitstream 110 to form the video stream 112. For example, decoding can decompress the video bitstream 110 to form the video stream 112 formatted for displaying on the display the display interface 120.

The video stream 112 is defined as a computationally modified version of the video source 108. For example, the video stream 112 can include a modified occurrence of the video source 108 with different resolution. The video stream 112 can include cropped decoded pictures from the video source 108.

The video decoder 104 can form the video stream 112 in a variety of ways. For example, the video decoder 104 can form the video stream 112 from the video layer 122. In another example, the video decoder 104 can form the video stream 112 from the video layer 122.

In a further example, the video stream 112 can have a different aspect ratio, a different frame rate, different stereoscopic views, different view order, or a combination thereof than the video source 108. The video stream 112 can have different visual properties including different color parameters, color planes, contrast, hue, or a combination thereof.

The video coding system 100 can include a display processor 118. The display processor 118 can receive the video stream 112 from the video decoder 104 for display on the display interface 120. The display interface 120 is a unit that can present a visual representation of the video stream 112.

For example, the display interface 120 can include a smart phone display, a digital projector, a DVD player display, or a combination thereof. Although the video coding system 100 shows the video decoder 104, the display processor 118, and the display interface 120 as individual units, it is understood that the video decoder 104 can include the display processor 118 and the display interface 120.

The video encoder 102 can send the video bitstream 110 to the video decoder 104 in a variety of ways. For example, the video encoder 102 can send the video bitstream 110 to the video decoder 104 over a communication path 106. In another example, the video encoder 102 can send the video bitstream 110 as a data file on a storage device. The video decoder 104 can access the data file to receive the video bitstream 110.

The communication path 106 can be a variety of networks suitable for data transfer. For example, the communication path 106 can include wireless communication, wired communication, optical, infrared, or the combination thereof. Satellite communication, cellular communication, terrestrial communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), digital television, and plain old telephone service (POTS) are examples of wired communication that can be included in the communication path 106.

The video coding system 100 can employ a variety of video coding syntax structures. For example, the video coding system 100 can encode and decode video information using High Efficiency Video Coding/H.265 (HEVC), scalable extensions for HEVC (SHVC), or other video coding syntax structures.

The video encoder 102 and the video decoder 104 can be implemented in a variety of ways. For example, the video encoder 102 and the video decoder 104 can be implemented using hardware, software, or a combination thereof. For example, the video encoder 102 can be implemented with custom circuitry, a digital signal processor, microprocessor, or a combination thereof. In another example, the video decoder 104 can be implemented with custom circuitry, a digital signal processor, microprocessor, or a combination thereof.

Figure 2:
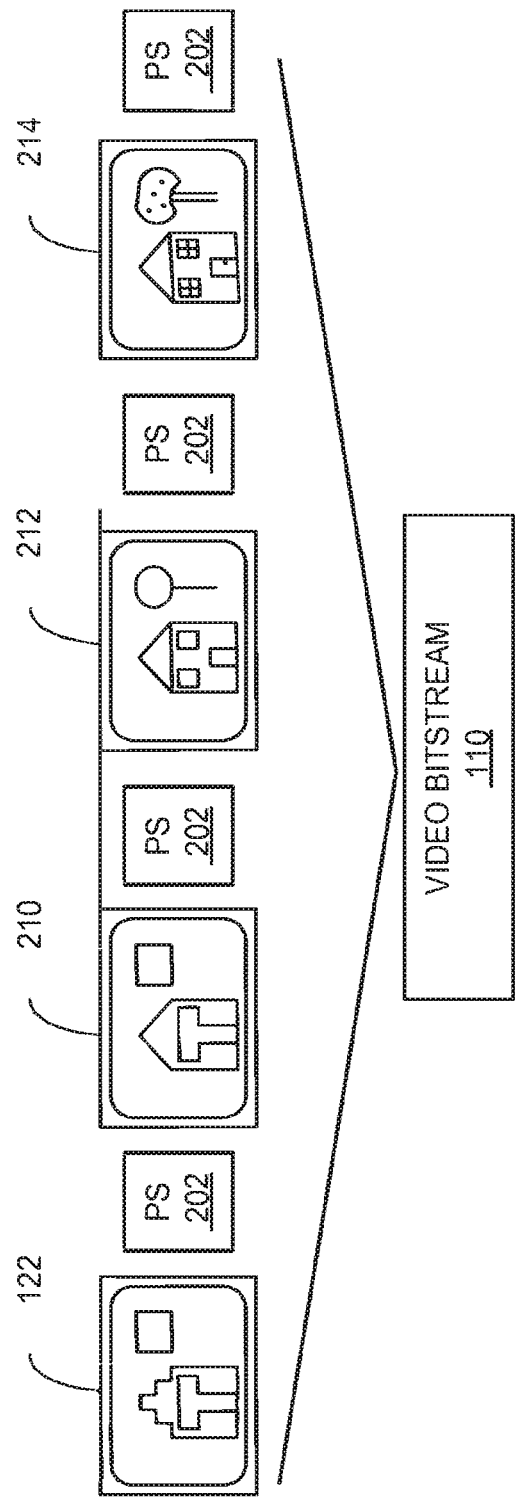
FIG. 2 is an example of the video bitstream.

Referring now to FIG. 2, therein is shown an example of the video bitstream 110. The video bitstream 110 includes an encoded occurrence of the video source 108 of FIG. 1 and can be decoded to form the video stream 112 of FIG. 1 for display on the display interface 120 of FIG. 1. The video bitstream 110 can include the video layer 122 based on the video source 108. The video bitstream 110 can include one of the frames 109 of FIG. 1 of the video layer 122 followed by a parameter set 202 associated with the video source 108.

Figure 3:
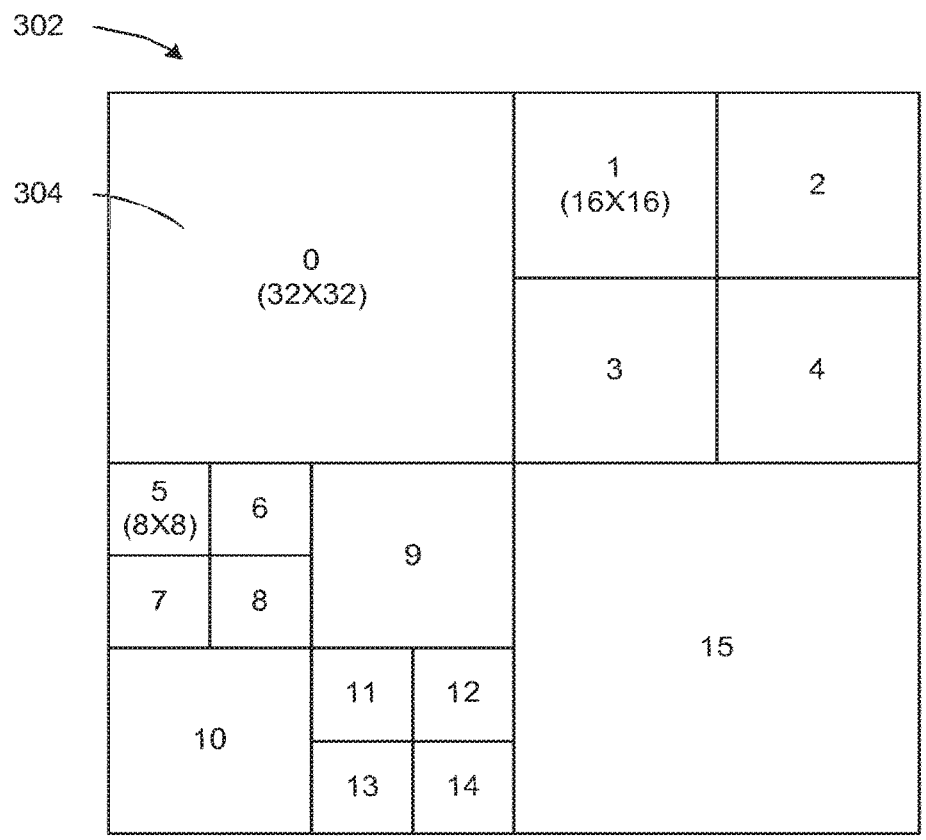
FIG. 3 is an example of a coding tree unit.

Referring now to FIG. 3, therein is shown an example of a coding tree unit 302. The coding tree unit 302 is a basic unit of video coding.

The video source 108 of FIG. 1 can include the frames 109 of FIG. 1. Each of the frames 109 can be split into the coding tree unit 302 of equal size.

The coding tree unit 302 can be subdivided into coding units 304 using a quadtree structure. The quadtree structure is a tree data structure in which each internal mode has exactly four children. The quadtree structure can partition a two dimensional space by recursively subdividing the space into four quadrants.

The frames 109 of the video source 108 can be subdivided into the coding units 304. The coding units 304 are square regions that make up one of the frames 109 of the video source 108.

The coding units 304 can be a variety of sizes. For example, the coding units 304 can be up to 64×64 pixels in size. Each of the coding units 304 can be recursively subdivided into four more of the coding units 304. In another example, the coding units 304 can include the coding units 304 having 64×64 pixels, 32×32 pixels, 16×16 pixels, or 8×8 pixels.

Figure 4:
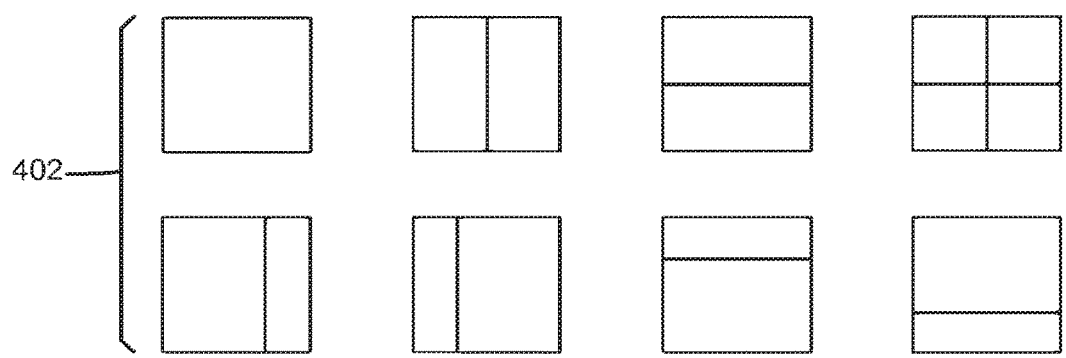
FIG. 4 is an example of prediction units.

Referring now to FIG. 4, therein is shown an example of prediction units 402. The prediction units 402 are regions within the coding units 304 of FIG. 3. The contents of the prediction units 402 can be calculated based on the content of other adjacent regions of pixels.

Each of the prediction units 402 can be calculated in a variety of ways. For example, the prediction units 402 can be calculated using intra-prediction or inter-prediction.

The prediction units 402 calculated using intra-predictions can include content based on neighboring regions. For example, the content of the prediction units 402 can be calculated using an average value, by fitting a plan surface to one of the prediction units 402, direction prediction extrapolated from neighboring regions, or a combination thereof.

The prediction units 402 calculated using inter-predictions can include content based on image data from the frames 109 of FIG. 1 that are nearby. For example, the content of the prediction units 402 can include content calculated using previous frames or later frames, content based on motion compensated predictions, average values from multiple frames, or a combination thereof.

The prediction units 402 can be formed by partitioning one of the coding units 304 in one of eight partition modes. The coding units 304 can include one, two, or four of the prediction units 402. The prediction units 402 can be rectangular or square.

For example, the prediction units 402 can be represented by mnemonics 2 N×2 N, 2 N×N, N×2 N, N×N, 2 N×nU, 2 N×nD, nL×2 N, and nR×2 N. Uppercase "N" can represent half the length of one of the coding units 304. Lowercase "n" can represent one quarter of the length of one of the coding units 304. Uppercases "R" and "L" can represent right or left respectively. Uppercases "U" and "D" can represent up and down respectively.

Figure 5:
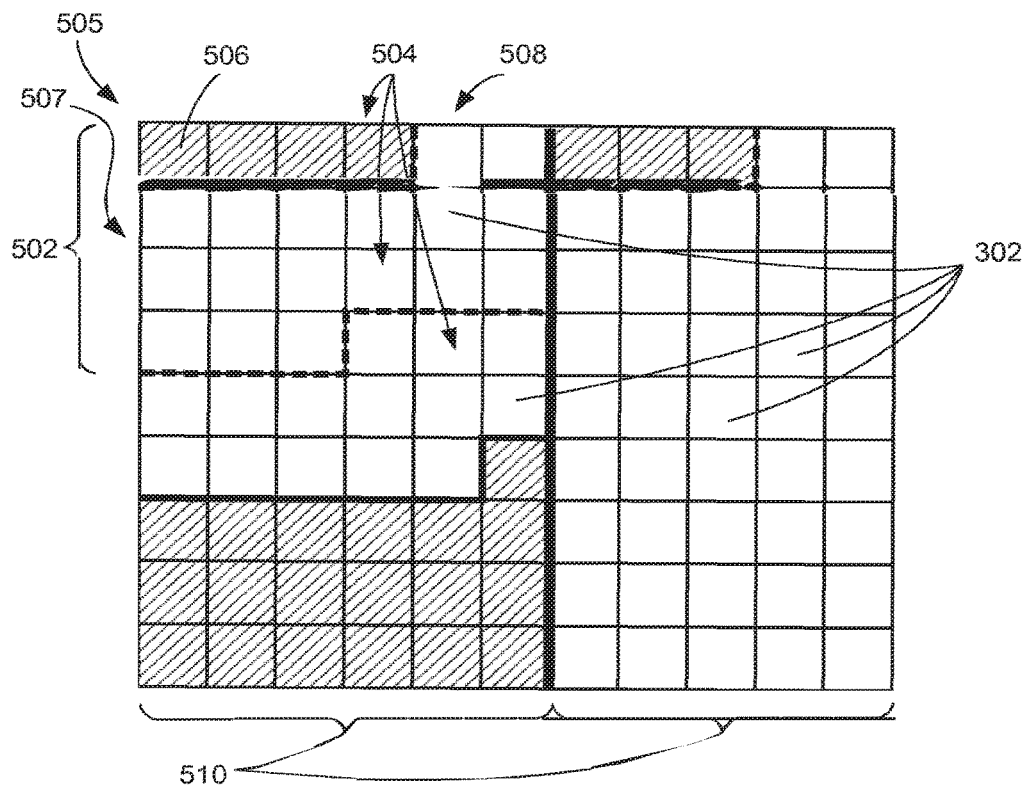
FIG. 5 is an example of grouping coding tree units.

Referring now to FIG. 5, therein is shown an example of grouping coding tree units 302. The coding tree units 302 can be grouped into slices 502 having slice segments 504.

The slices 502 are sequences of one or more of the slice segments 504. The slices 502 start with one of independent slice segments 505 and include all subsequent dependent slice segments 507 that precede the next one of the independent slice segments 505 within the same access unit.

The coding tree units 302 can be partitioned into the slices 502 having the slice segments 504. The slice segments 504 are sequences of one or more of the coding tree units 302.

A division of the slices 502 into the coding tree units 302 is a partitioning. One of the slices 502 can include one or more of the coding tree units 302.

The coding tree units 302 can be divided into two or more of the slices 502. A first slice 506 can include a first independent slice segment 508 and two of dependent slice segments 504. The slices 502 can include data structures that can be decoded independently from other slices 502 of the same picture, in terms of compression methods including entropy coding, signal prediction, and residual signal reconstruction.

Each of the slices 502 can be either an entire picture or a region of a picture. One of the purposes of the slices 502 is re-synchronization in an event of data losses. In a case of packetized transmission, a maximum number of payload bits within each of the slices 502 can be restricted. A number of the coding tree units 302 in each of the slices 502 can be varied to minimize a packetization overhead while keeping a size of each packet within this bound.

One of the frames 109 of FIG. 1 can be divided into tiles 510. The tiles 510 are rectangular portions of the coding tree units 302. The tiles 510 represent an integer number of the coding tree units 302. The tiles 510 can include one of the coding tree units 302 included in one of the slices 502.

The tiles 510 allow a picture to be divided up into a grid of rectangular regions that can independently be decoded or encoded. A purpose of the tiles 510 can allow for parallel processing. The tiles 510 can be independently decoded and can even allow for random access to specific regions of a picture in a video stream. The slices 502 can be decoded independently from each other with a purpose of the tiles 510 being re-synchronization in case of data loss in the video stream.

A purpose of the tiles 510 can increase a capability for parallel processing rather than provide error resilience. The tiles 510 can include independently decodable regions of a picture that are encoded with shared header information. Therefore, the tiles 510 can additionally be used for a purpose of random access to local regions of video pictures. A configuration of the tiles 510 of a picture can include segmenting the picture into rectangular regions with approximately equal numbers of the coding tree units 302 in each of the tiles 510.

All or a number of the coding tree units 302 in one of the slices 502 can belong to the one of the tiles 510. All or a number of the coding tree units 302 in one of the tiles 510 can belong to the same one of the tiles 510. All or a number of the coding tree units 302 in one of the slice segments 504 can belong to one of the tiles 510. All or a number of the coding tree units 302 in one of the tiles 510 can belong to one of the slice segments 504.

Figure 6:
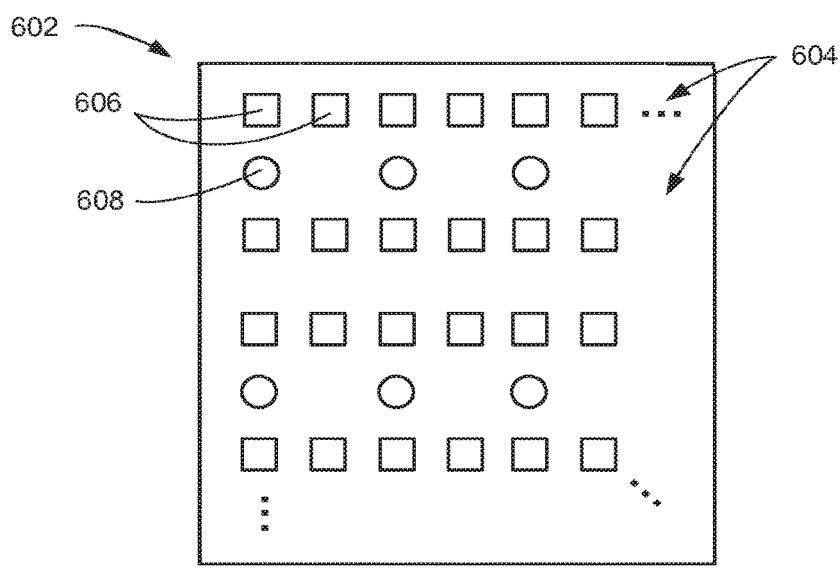
FIG. 6 is an example of a color space in the video coding system of FIG. 1.

Referring now to FIG. 6, therein is shown an example of a color space 602 in the video coding system 100 of FIG. 1. The color space 602 describes a mechanism for representing color elements in a picture.

Each of the frames 109 of FIG. 1 of the video source 108 of FIG. 1 and the video stream 112 of FIG. 1 can include one or more sample arrays 604. The sample arrays 604 can represent pixels having color schemes. The sample arrays 604 can include monochrome luma pixels 606 only. The sample arrays 604 can include the monochrome luma pixels 606 and two chroma pixels 608. For example, the chroma pixels 608 can include YUV pixels, red-green-blue pixels (RGB), or arrays representing other color systems.

Figure 7:
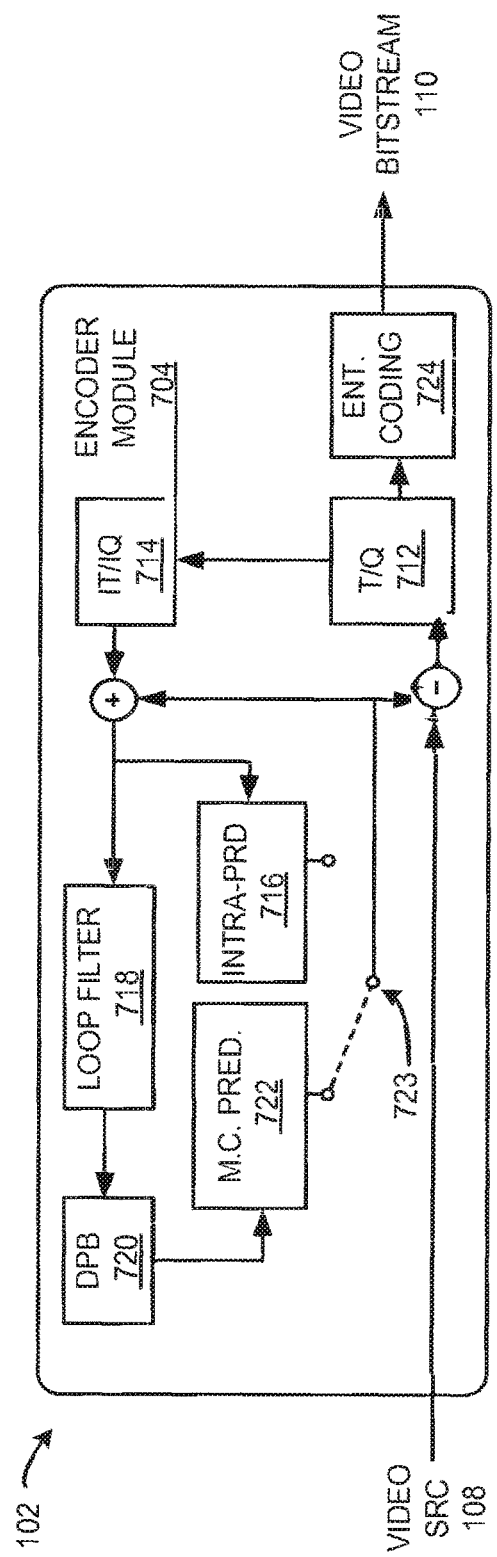
FIG. 7 is an exemplary block diagram of the video encoder.

Referring now to FIG. 7, therein is shown an exemplary block diagram of the video encoder 102. The video encoder 102 can form the video layer 122 of FIG. 1 based on the video source 108.

The video encoder 102 can receive the video source 108. The video encoder 102 can encode the video source 108 to form the video bitstream 110.

The video coding system 100 of FIG. 1 can include the video decoder 104 of FIG. 1 for decoding the video bitstream 110 provided by the video encoder 102. The video decoder 104 can have a complementary structure to the video encoder 102 for forming the video stream 112 of FIG. 1 based on the video layer 122. It is understood that the video decoder 104 can include similar modules to the video encoder 102.

The video encoder 102 can include an encoder module 704. The encoder module 704 can be implemented in a variety of ways. For example, the encoder module 704 can be a HEVC/Advanced Video coding (AVC) encoder.

The encoder module 704 can receive the video source 108 and form the video layer 122. The video source 108 can be at the original resolution or can be downsampled to reduce the resolution or quality.

The encoder module 704 can include a transformation and quantization module 712 for performing transformation operations, scaling operations, quantization operations, or a combination thereof. The transformation and quantization module 712 can receive the video source 108 and intermediate video content and pass additional intermediate video content to an entropy coding module 724 for forming the video bitstream 110.

The intermediate video content is partially processed video information used by the encoder module 704. The intermediate video content can include portions of frames, motion elements, regions, color maps, tables, or a combination thereof.

The encoder module 704 can include an inverse transformation and inverse quantization module 714. The inverse transformation and inverse quantization module 714 can perform inverse transformation and inverse quantization operations on the intermediate video content received from the transformation and quantization module 712.

The encoder module 704 can include an intra-picture prediction module 716. The intra-picture prediction module 716 can calculate portions of the intermediate video content based on adjacent regions within one of the frames 109 of FIG. 1. The intra-picture prediction module 716 can receive intermediate video content from the inverse transformation and inverse quantization module 714.

The encoder module 704 can include a loop filter module 718 for processing the intermediate video content based on loop levels with the encoder module 704. The loop filter module 718 can process and send the intermediate video content to a digital picture buffer module 720. The loop filter module 718 can process reconstructed samples or portions of the video layer 122 before writing into the digital picture buffer module 720. The loop filter module 718 can improve the reconstructed picture quality for better temporal prediction for future pictures.

The encoder module 704 can include the digital picture buffer module 720. The digital picture buffer module 720 can include memory storage for holding intermediate video content. The digital picture buffer module 720 can receive the intermediate video content from the loop filter module 718 and buffer the information for future loop iterations. The digital picture buffer module 720 can send the intermediate video content to a motion compensation prediction module 722.

The encoder module 704 can include the motion compensation prediction module 722. The motion compensation prediction module 722 calculate motion compensation and motion vector information based on multiple frames from the video source 108 and intermediate video content.

The encoder module 704 can selectively loop the output of the intra-picture prediction module 716 or the motion compensation prediction module 722 back to the transformation and quantization module 712 using a mode selector 723. The mode selector 723 can select the output of the intra-picture prediction module 716 or the motion compensation prediction module 722 for sending to the transformation and quantization module 712. The selection of which module to select is based on the content of the video source 108.

The encoder module 704 can include the entropy coding module 724. The entropy coding module 724 can encode the residual portions of the video source 108 to form a portion of the video layer 122. The entropy coding module 724 can output the video bitstream 110.

It has been found that the encoding the video source 108 with the video encoder 102 to form the video layer 122 to form the video bitstream 110 increases the level of video compression and increases operation flexibility. Providing the video layer 122 in the video bitstream 110 allows the formation of the video stream 112 at different resolutions at a lower bandwidth by partitions the compressed video information.

It has been found that the video encoder 102 having the encoder module 704 can increase performance and flexibility. By encoding the video layer 122, the video coding system 100 can provide different resolutions and image sizes to support different video display systems.

Figure 8:
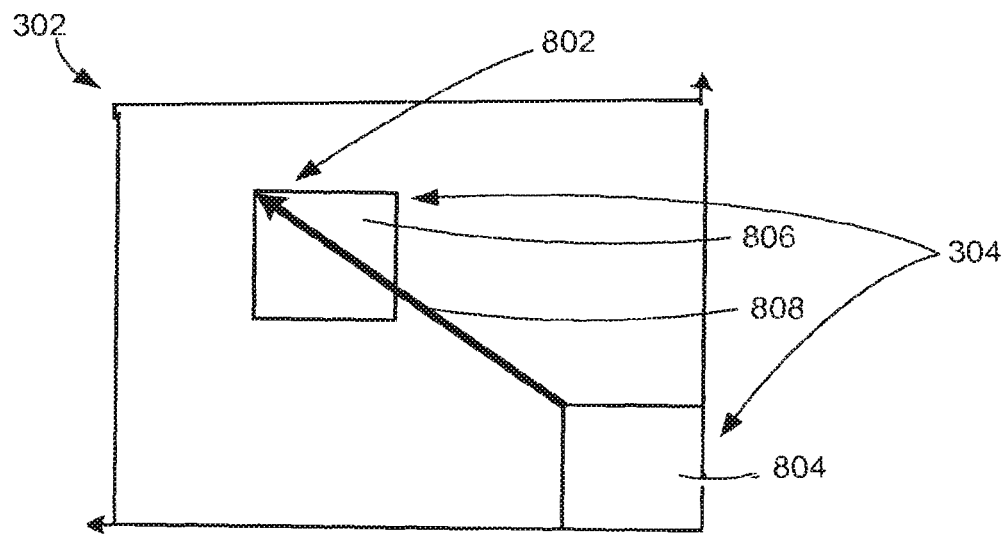
FIG. 8 is an example of an intra block copy process of the video coding system of FIG. 1.

Referring now to FIG. 8, therein is shown an example of an intra block copy process 802 of the video coding system 100 of FIG. 1. The intra block copy process 802 is a method of estimating a current coding unit 804 by copying a content of a reference coding unit 806.

The intra block copy process 802 is different from an intra block copying prediction mode such that the intra block copy process 802 provides solutions for restricting a range of an intra copy motion vector 808, which is not specified in the intra block copying prediction mode. The intra block copying prediction mode may be considered in extension works focusing on screen contents or any other extension works of HEVC.

The scope of the embodiments of the present invention can be broadened such that it can cover the extension works. For example, the extension works can be based on, extended from, and not in a version of the High-Efficiency Video Coding (HEVC) including version 1.

The current coding unit 804 is one of the coding units 304, where the content is copied from another one of the coding units 304 from within the same coding tree unit 302 or from another of the coding tree units 302. The current coding unit 804 is generated based on the restriction of the range of the intra copy motion vector 808 according to the intra block copy process 802.

The current coding unit 804 can include the intra copy motion vector 808 representing a path from an upper left corner of the reference coding unit 806 to an upper left corner of the current coding unit 804. The reference coding unit 806 is within the range of the intra copy motion vector 808 as restricted for the intra block copy process 802.

Figure 9:
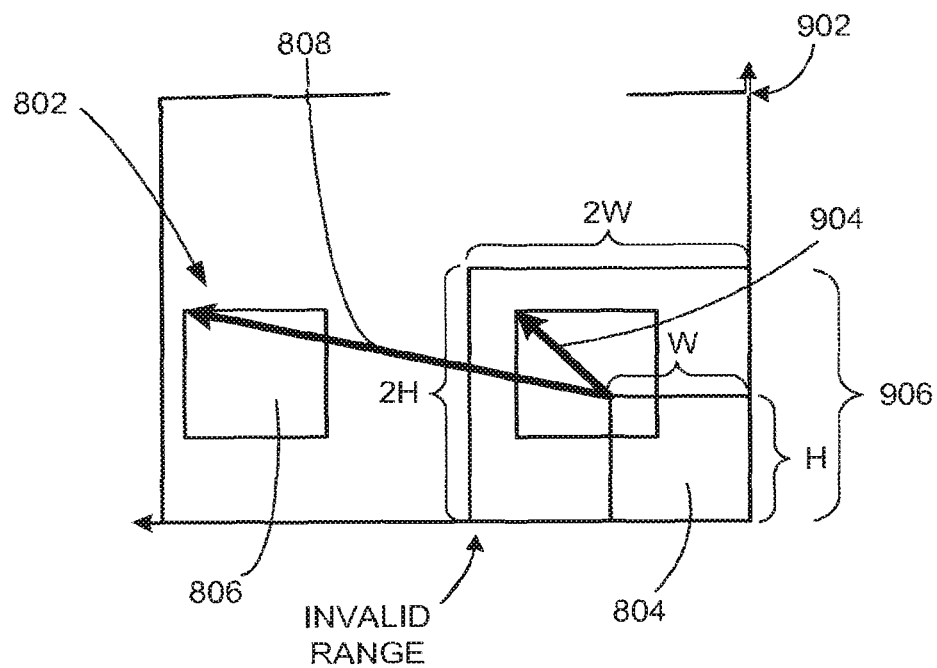
FIG. 9 is an example of a search range for the intra block copy process.

Referring now to FIG. 9, therein is shown an example of a search range 902 for the intra block copy process 802. FIG. 9 depicts redundancy in coding of the intra copy motion vector 808.

For example, a motion vector of the intra block copying prediction mode is coded using a motion vector difference (MVD) coding scheme directly. Because of a causality of intra block copying, motion vector values cannot be arbitrary in the search range 902. For example, the current coding unit 804 cannot copy the reference coding unit 806, which overlaps with the current coding unit 804. Thus, there are invalid motion vectors 904 as shown in FIG. 9.

The invalid motion vectors 904 lead to the redundancy in motion vector (MV) coding of the intra block copying prediction mode. To remove the redundancy, the solutions are proposed in the embodiments of the present invention, which will subsequently be described in more details.

FIG. 9 depicts the invalid motion vectors 904 pointing from the current coding unit 804 when the reference coding unit 806 is within a restricted region 906. The restricted region is a region having an invalid range of pixels of a picture, within which the reference coding unit 806 cannot exist in order to prevent the problem with the redundancy. For illustration purposes, the restricted region 906 is shown having a width of 2 W and a height of 2 H, although it is understood that the restricted region 906 can have any widths and heights, where W and H are a width and a height, respectively, of a number of pixels in a horizontal direction and a vertical direction, respectively.

The intra copy motion vector 808 is shown as a valid motion vector since the intra copy motion vector 808 is pointing from the current coding unit 804 to the reference coding unit 806. The reference coding unit 806 is outside of and not within the restricted region 906. The current coding unit 804 can be in the restricted region 906.

Figure 10:
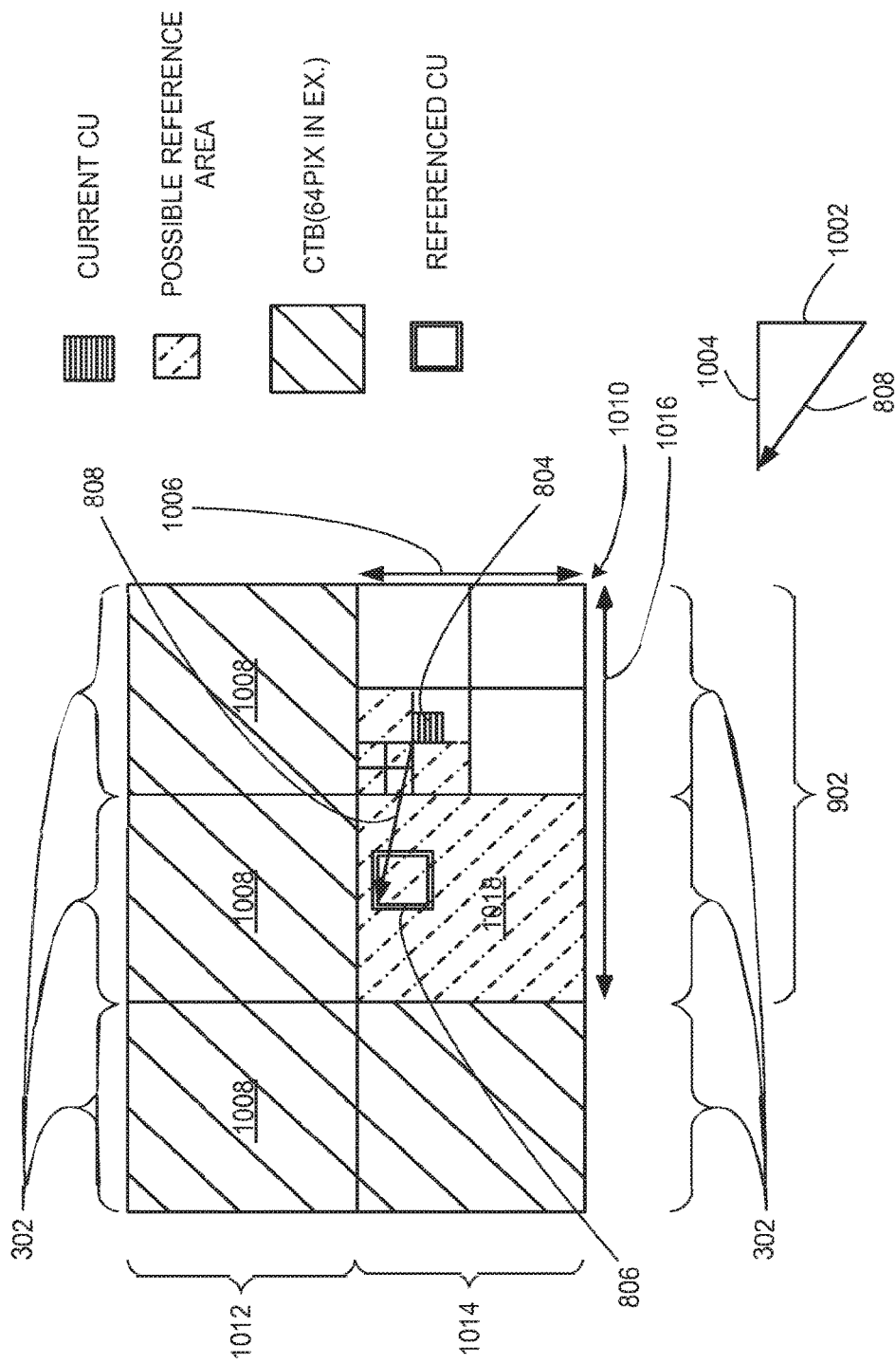
FIG. 10 is an example of the reference coding unit.

Referring now to FIG. 10, therein is shown an example of the reference coding unit 806. FIG. 10 depicts a diagram that shows how the current coding unit 804 references the reference coding unit 806 out of a possible reference area or the search range 902.

An arrow from the current coding unit 804 to the reference coding unit 806 is an intra block vector, a motion vector, or the intra copy motion vector 808. The intra copy motion vector 808 can be projected to a vertical direction and get a vertical component 1002 of the intra copy motion vector 808 and similarly projected to a horizontal direction and get a horizontal component 1004 of the intra copy motion vector 808.

The current coding unit 804 can be in a coding tree block (CTB) or one of the coding tree units 302. Each of the coding tree units 302 can include any number of pixels in for the width and the height. For example, each of the coding tree units 302 can include 64 pixels by 64 pixels.

The example shows the possible reference area limited to be one CTB height vertically and one CTB horizontally to the left of the current coding unit 804, as the search range 902 restricted by the intra block copy process 802 of FIG. 8 of the embodiments of the present invention. In this case, the reference coding unit 806 is within one of the coding tree units 302 immediately to the left of one of the coding tree units 302, to which the current coding unit 804 belongs.

The search range 902 can include a vertical motion range 1006, which limits a search for the intra copy motion vector 808 in a vertical direction from the current coding unit 804 in one of the frames 109 of FIG. 1. The vertical motion range 1006 is limited so that the vertical motion range 1006 does not include any of upper coding tree units 1008, which are the coding tree units 302 that are immediately above a current coding tree unit 1010. The current coding tree unit 1010 is one of the coding tree units 302 to which the current coding unit 804 belongs.

The upper coding tree units 1008 are within an upper coding unit row 1012 directly abutting a current coding unit row 1014, which includes a sequence or line with a number of the coding tree units 302, one of which includes the current coding unit 804. None of the coding tree units 302 are located directly in between or intervening the upper coding unit row 1012 and the current coding unit row 1014. The upper coding unit row 1012 and the current coding unit row 1014 do not have any intervening coding tree units in between the upper coding unit row 1012 and the current coding unit row 1014.

The search range 902 can include a horizontal motion range 1016, which limits a search for the intra copy motion vector 808 in a horizontal direction from the current coding unit 804 in one of the frames 109. The horizontal motion range 1016 is limited so that only a left coding tree unit 1018 and the current coding tree unit 1010 are allowed to be used to search for the reference coding unit 806. The left coding tree unit 1018 and the current coding tree unit 1010 are abutting each other such that none of the coding tree units 302 is located directly in between or intervening the left coding tree unit 1018 and the current coding tree unit 1010.

Figure 11:
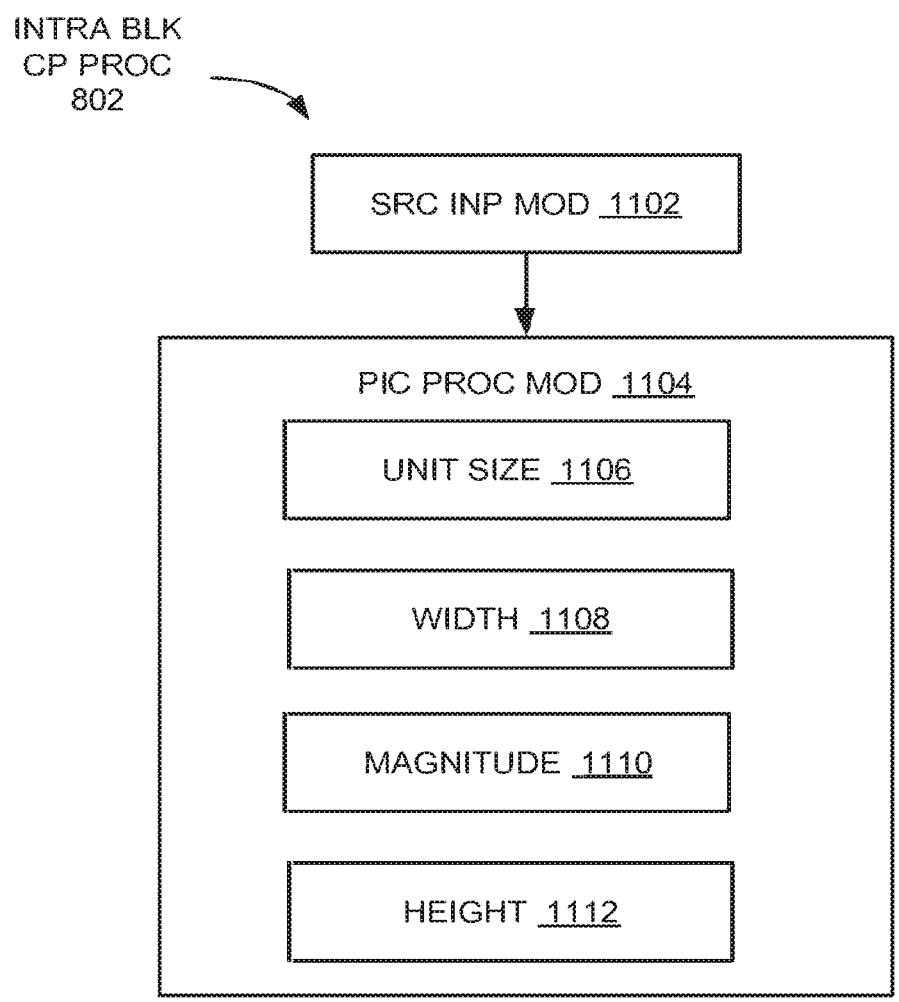
FIG. 11 is a flow diagram of the intra block copy process of FIG. 8.

Referring now to FIG. 11, therein is shown a flow diagram of the intra block copy process 802 of FIG. 8. The intra block copy process 802 includes a motion vector range or the search range 902 of FIG. 9 of the intra copy motion vector 808 of FIG. 8. The intra block copy process 802 can be implemented in the intra-picture prediction module 716 of FIG. 7.

The video coding system 100 of FIG. 1 can include a source input module 1102 for receiving the frames 109 of FIG. 1 from the video source 108 of FIG. 1. The video coding system 100 can include the video stream 112 of FIG. 1 and the video bitstream 110 of FIG. 1, which can then be processed by other modules in the video encoder 102 of FIG. 1 and the video decoder 104 of FIG. 1, respectively.

The video coding system 100 can include a picture process module 1104 for processing a picture or one of the frames 109 at a time. The picture process module 1104 processes the picture by encoding video data or decoding coded data of the picture or the frames 109 using the intra block copy process 802. The picture process module 1104 can be coupled to the source input module 1102.

The picture process module 1104 can process the frames 109 by generating the reference coding unit 806 of FIG. 8. The picture process module 1104 can generate the intra copy motion vector 808 pointing to the reference coding unit 806 within the search range 902, wherein the search range 902 does not include any of the upper coding tree units 1008 of FIG. 10, and the search range 902 includes only the left coding tree unit 1018 of FIG. 10, the current coding tree unit 1010 of FIG. 10, or a combination thereof.

The picture process module 1104 can generate the current coding unit 804 of FIG. 8 based on the intra copy motion vector 808. The picture process module 1104 can generate the video bitstream 110 based on the intra copy motion vector 808. The video bitstream 110 can then be sent through the communication path 106 of FIG. 1 to the video decoder 104 to receive and decode to generate the video stream 112 for displaying on a device, such as the display interface 120 of FIG. 1.

The picture process module 1104 can generate the intra copy motion vector 808 to point to the reference coding unit 806, which can represent any of the coding units 304 of FIG. 3 having sizes in a number of pixels smaller than a size in a number of pixels of the left coding tree unit 1018. The current coding unit 804 can represent any of the coding units 304 having sizes in a number of pixels smaller than a size in a number of pixels of the current coding tree unit 1010.

The left coding tree unit 1018, the current coding tree unit 1010, the upper coding tree units 1008, or a combination thereof can include any number of the coding units 304. The left coding tree unit 1018, the current coding tree unit 1010, the upper coding tree units 1008, or a combination thereof can include the same number of the coding units 304. A number of the upper coding tree units 1008 in the upper coding unit row 1012 of FIG. 10 can be equal to a number of the coding tree units 302 of FIG. 3 in the current coding unit row 1014 of FIG. 10.

For example, the search range 902 can be applied for the intra block copying prediction mode in HEVC. Also for example, the intra block copying (IntraBC) prediction mode was used as additional intra coding mode. A large range can be set for a motion vector of the IntraBC. The intra block copying prediction mode increases the complexity of the IntraBC by referencing more reference area.

The intra block copying (IntraBC) prediction mode may be adopted in HEVC. The IntraBC increases the complexity by requiring more memory for previous reconstructed samples for motion estimation in an encoder and motion compensation in a decoder.

A problem exists in a BvIntra range of the intra block copying prediction mode. The problem relates to a large search area required for intra prediction using the IntraBC. For example, the BvIntra range is specified as follows.

A variable of BvIntra[x0][y0][compIdx] specifies a vector used for the intra block copying prediction mode. A value of BvIntra[x0][y0] shall be in a range of 0 to 128, inclusive. Array indices x0, y0 specify a location (x0, y0) of a top-left luma sample of a considered prediction block relative to a top-left luma sample of a picture. A horizontal block vector component is assigned compIdx=0, and a vertical block vector component is assigned compIdx=1. The value of BvIntra[x0][y0] takes 0 to 128, which covers the large search area, especially upper coding tree unit (CTU) line pixels.

If refList is equal to 0, MvdL0[x0][y0][compIdx] is set equal to 1Mvd[compIdx] for compIdx=0 . . . 1. Otherwise, if refList is equal to 1, MvdL1[x0][y0][compIdx] is set equal to 1Mvd[compIdx] for compIdx=0 . . . 1. Otherwise if refList is equal to 2, BvIntra[x0][y0][compIdx] is set equal to 1Mvd[compIdx] for compIdx=0 . . . 1.

It is asserted that upper CTU line pixels can be referred by the IntraBC according to a current restriction of the intra block copying prediction mode. From an implementation point of view, it is a great concern since it implies forcing to run an in-loop filter process frame by frame.

For CTU-based in-loop filtering architectures, the upper CTU line pixels are stored in a decoded picture buffer (DPB), which is usually located on dynamic random-access memory (DRAM), after the in-loop filtering is processed. Intermediate pixels like before the in-loop filtering are not available for the current CTU. If the intermediate pixels in the upper CTU line are required by the IntraBC, a significant DRAM bandwidth increases to store and load the intermediate pixels is inevitable. Alternatively, expensive cache memory is necessary for storage.

On the other hand, a BvIntra search range or the search range 902 as proposed by the intra block copy process 802 is restricted or constrained not to access the upper CTU line pixels in the upper coding tree units 1008. An IntraBC performance can be measured under the constraint.

Thus, it is proposed by the embodiments to clarify or change the restriction in the text as follows to align a reference or test software. The change is to emphasize the constraint not to use the upper CTU line pixels.

The value of BvIntra[x0][y0][0] can be in the range of −(2*CtbSizeY) to (CtbSizeY−nCbS). The value of BvIntra [x0][y0][1] can be in the range of −(y0% CtbSizeY) to (CtbSizeY−nCbS).

BvIntra[x0][y0][0] is a horizontal component of an intra block vector, BvIntra[x0][y0][1] is a vertical component of an intra block vector. CtbSizeY is a height of a coding tree block. nCbs is a size of a coding block. Y0 is a vertical component of a top left sample location. % is a remainder operator.

The reference pixels can be available for any BvIntra value, which satisfies the above restriction. For the horizontal component 1004 of FIG. 4, it is recommended to restrict further based on a discussion in terms of coding efficiency.

In order to align BvIntra coding improvement proposal in FIG. 9, following is suggested since BvIntra is an MVD value. The specification of the intra block copy process 802 is described as follows. A bitstream conformance for an input bitstream or the video bitstream 110 that a reconstructed vector for the intra block copying prediction mode can satisfy the following restriction in Equations 1-2.

$$\text{bvIntra[0] in the range of } -(2*CtbSizeY) \text{ to } (CtbSizeY-nCbS). \quad \text{(Eq. 1)}$$

$$\text{bvIntra[1] in the range of } -(yTbCmp\%CtbSizeY) \text{ to } (CtbSizeY-nCbS). \quad \text{(Eq. 2)}$$

bvIntra[0] is a horizontal component of an intra block vector. bvIntra[1] is a vertical component of an intra block vector. yTbCmp is a height of a tree block.

The embodiments of the present invention propose the solutions to set reasonable range limits for restricting the search range 902 of the intra copy motion vector 808. The embodiments save or do without a large line buffer. As such, to reduce cost and complexity for implementation, the embodiments of the present invention provide the solutions for restricting the motion vector range for the IntraBC.

The solutions provide the intra copy motion vector 808 having the vertical motion range 1006 of FIG. 10 that is restricted to not cover any of the upper coding tree units 1008. The solutions also provide the horizontal motion range 1016 of FIG. 10, which includes only the left coding tree unit 1018 and the current coding tree unit 1010. The solutions provide a horizontal motion restriction that can be loosen based on a trade-off between complexity and coding efficiency.

The intra block copy process 802 is a new process that can employ a whole block of one of the coding tree units 302, not neighboring pixels of the current coding unit 804, within the same picture of the same frame of one of the frames 109 of FIG. 1. This is different from the intra block copying prediction mode or any other prediction modes that employ only neighboring pixels but the intra block copy process 802 entirely uses all of pixels or picture elements in both the left coding tree unit 1018 and the current coding tree unit 1010 for the search range 902.

The intra block copy process 802 is studied from an implementation point of view in this contribution of the embodiments of the present invention. For clean-up and bug-fixes purposes of the intra block copying prediction mode, several modifications are proposed by the embodiments.

It is proposed in the embodiments to clarify a block vector for intra prediction (BvIntra) range restriction, especially for the vertical component 1002 of FIG. 10. The BvIntra range restriction applies to the restriction of the search range 902 of the intra copy motion vector 808 according to the intra block copy process 802. It is also proposed to modify a MV coding of the IntraBC of the intra block copying prediction mode.

The invalid motion vectors 904 of FIG. 9 lead to the redundancy in motion vector (MV) coding of the intra block copying prediction mode. To remove the redundancy, the solutions previously mentioned are proposed in the embodiments of the present invention.

A first solution is described as follows. As demonstrated in FIG. 9, absolute values of the horizontal component 1004, denoted as MVx, and the vertical component 1002, denoted as MVy, of the intra copy motion vector 808 in the intra block copy process 802 cannot be both less than a unit size 1106 of the current coding unit 804. The current coding unit 804 can represent the current coding unit 804.

In the other words, if the horizontal component 1004 is less than a width 1108, denoted as W, of the current coding unit 804 a magnitude 1110, denoted as |MVy|, of the vertical component 1002 has to be larger or greater than a height 1112, denoted as H, of the current coding unit 804. The magnitude 1110 can be reduced to save bits in coding the values.

At the video encoder 102 side, before the intra copy motion vector 808 is encoded (i.e., MVx and MVy), the following in Equation 3 can apply.

$$\text{If abs}(MVx) < W, MVy + = H, \text{ where} \quad \text{(Eq. 3)}$$

"abs(MVx)" is an absolute value of the horizontal component 1004, "<" is less than, and "MVy+=H" is a new value of the vertical component 1002 is assigned to a sum of a current value of the vertical component 1002 and the height 1112 of the current coding unit 804.

At the video decoder 104 side, after the intra copy motion vector 808 is parsed from the video bitstream 110, the following in Equation 4 can apply.

$$\text{If abs}(MVx) < W, MVy - = H, \text{ where} \quad \text{(Eq. 4)}$$

"abs(MVx)" is an absolute value of the horizontal component 1004, "<" is less than, and "MVy−=H" is a new value of the vertical component 1002 assigned to a difference of a current value of the vertical component 1002 and the height 1112 of the current coding unit 804.

A specification of the intra block copy process 802 is described below. Inputs to this process can include a sample location, a transform block size, a block copying vector, and a colour component. The sample location, denoted as (xTbCmp, yTbCmp), can specify a top-left sample of a current transform block or the current coding unit 804, relative to a top left sample of a current picture or one of the frames 109 currently processed. The transform block size, denoted as nTbS, is a variable or information specifying a block size of the current coding unit 804.

The block copying vector, denoted as bvIntra, is a variable or information associated with a motion vector of the current coding unit 804 to the reference coding unit 806. The block copying vector can represent the intra copy motion vector 808. The colour component, denoted as cIdx, is a variable or information specifying colors of the current coding unit 804.

Outputs of this process can include predicted samples, denoted as predSamples[x][y], with x, y=0 . . . nTbS−1. In addition to the description above, the first solution includes proposed changes, which will subsequently be described below. For example, the proposed changes can be introduced as follows.

A variable, denoted as by, representing a block vector or the intra copy motion vector 808 for prediction in full-sample units can be derived using Equations 5-6 as follows.

$$bv[0]=bvIntra[0]\gg(((cIdx==0)?1:SubWidthC)-1) \quad (Eq.\ 5)$$

$$bv[1]=(abs(bvIntra[0])<nTbs?bvIntra[1]-nTbs:bvIntra[1])\gg(((cIdx==0)?1:SubHeightC)-1) \quad (Eq.\ 6)$$

bvIntra[0] is a horizontal component of an intra block vector. bvIntra[1] is a vertical component of an intra block vector. 0 and 1 are indices for horizontal and vertical components. cIdx is an index for a color component. SubWidthC and SubHeightC are a width and a height of a chroma component of the same coding block.

In Equation 6 above, "abs" refers to an absolute value of a variable. bv[1] can be determined based on a quantity bitwise right-shifted by a shift value. When abs(bvIntra[0]) is less than nTbs, the quantity is a difference of bvIntra[1] and nTbs. Otherwise, the quantity is bvIntra[1]. If cIdx is equal to 0, the shift value is 1. Otherwise, the shift value equals to SubHeightC. The quantity is then right-shifted, denoted by ">>", by the shift value minus 1.

A (nTbS)×(nTbS) array of the predicted samples, with x, y=0 . . . nTbS-1, can be derived as follows. A reference sample location, denoted as (xRefCmp, yRefCmp), can be specified by Equation 7.

$$(xRefCmp,yRefCmp)=(xTbCmp+x+bv[0],yTbCmp+y+bv[1]) \quad (Eq.\ 7)$$

Each sample at the location (xRefCmp, yRefCmp) can be assigned to predSamples[x][y].

A second solution is described as follows. Alternative to MVx previously described, a condition can be based on MVy and modification can be applied to MVx for saving bits. At the video encoder 102 side, before the intra copy motion vector 808 is encoded (i.e., MVx and MVy), the following in Equation 8 can apply.

$$\text{If } abs(MVy)<H, MVx+=W, \text{ where} \quad (Eq.\ 8)$$

"abs(MVy)" is an absolute value of the vertical component 1002, "<" is less than, and "MVx+=W" is a new value of the horizontal component 1004 is assigned to a sum of a current value of the horizontal component 1004 and the width 1108 of the current coding unit 804.

At the video decoder 104 side, after the intra copy motion vector 808 is parsed from the video bitstream 110, the following in Equation 9 can apply.

$$\text{If } abs(MVy)<H, MVy-=W \quad (Eq.\ 9)$$

"abs(MVy)" is an absolute value of the vertical component 1002, "<" is less than, and "MVy-=W" is a new value of the vertical component 1002 assigned to a difference of a current value of the vertical component 1002 and the width 1108 of the current coding unit 804.

A specification of the intra block copy process 802 is described below. Inputs to this process can include the sample location, the transform block size, the block copying vector, and the colour component. The sample location, denoted as (xTbCmp, yTbCmp), can specify a top-left sample of a current transform block or the current coding unit 804, relative to a top left sample of a current picture or one of the frames 109 currently processed. The transform block size, denoted as nTbS, is a variable or information specifying a block size of the current coding unit 804.

The block copying vector, denoted as bvIntra, is a variable or information associated with a motion vector of the current coding unit 804 to the reference coding unit 806. The block copying vector can represent the intra copy motion vector 808. The colour component, denoted as cIdx, is a variable or information specifying colors of the current coding unit 804.

Outputs of this process can include the predicted samples, denoted as predSamples[x][y], with x, y=0 . . . nTbS-1. In addition to the description above, the second solution includes proposed changes, which will subsequently be described below. For example, the proposed changes can be introduced as follows.

The variable by representing the block vector or the intra copy motion vector 808 for prediction in full-sample units can be derived using Equations 10-11 as follows.

$$bv[0]=(abs(bvIntra[1])<nTbs?bvIntra[0]-nTbs:bvIntra[0])\gg(((cIdx==0)?1:SubWidthC)-1) \quad (Eq.\ 10)$$

$$bv[1]=bvIntra[1]\gg(((cIdx==0)?1:SubHeightC)-1) \quad (Eq.\ 11)$$

In Equation 10 above, "abs" refers to an absolute value of a variable. bv[0] can be determined based on a quantity bitwise right-shifted by a shift value. When abs(bvIntra[1]) is less than nTbs, the quantity is a difference of bvIntra[0] and nTbs. Otherwise, the quantity is bvIntra[0]. If cIdx is equal to 0, the shift value is 1. Otherwise, the shift value equals to SubWidthC. The quantity is then right-shifted, denoted by ">>", by the shift value minus 1.

The (nTbS)×(nTbS) array of the predicted samples, with x, y=0 . . . nTbS-1, can be derived as follows. The reference sample location (xRefCmp, yRefCmp) can be specified by Equation 12.

$$(xRefCmp,yRefCmp)=(xTbCmp+x+bv[0],yTbCmp+y+bv[1]) \quad (Eq.\ 12)$$

Each sample at the location (xRefCmp, yRefCmp) can be assigned to predSamples[x][y].

A third solution is described as follows. The MVD coding scheme assumes a symmetric distribution of syntax elements, while motion vectors of the intra block copy process 802 demonstrate a shifted peak at MVx to a horizontal negative region. It is proposed to simply shift the MVx without conditions.

A specification of the intra block copy process 802 is described below. Inputs to this process can include the sample location, the transform block size, the block copying vector, and the colour component. The sample location, denoted as (xTbCmp, yTbCmp), can specify a top-left sample of a current transform block or the current coding unit 804, relative to a top left sample of a current picture or one of the frames 109 currently processed. The transform block size, denoted as nTbS, is a variable or information specifying a block size of the current coding unit 804.

The block copying vector, denoted as bvIntra, is a variable or information associated with a motion vector of the current coding unit 804 to the reference coding unit 806. The block copying vector can represent the intra copy motion vector 808. The colour component, denoted as cIdx, is a variable or information specifying colors of the current coding unit 804.

Outputs of this process can include the predicted samples, denoted as predSamples[x][y], with x, y=0 . . . nTbS-1. In addition to the description above, the third solution includes proposed changes, which will subsequently be described below. For example, the proposed changes can be introduced as follows.

The variable by representing the block vector or the intra copy motion vector 808 for prediction in full-sample units can be derived using Equations 13-14 as follows.

$$bv[0]=(bvIntra[0]-nTbs)\gg(((cIdx==0)?1:SubWidthC)-1) \quad \text{(Eq. 13)}$$

$$bv[1]=bvIntra[1]\gg(((cIdx==0)?1:SubHeightC)-1) \quad \text{(Eq. 14)}$$

In Equation 13 above, bv[0] can be determined based on a quantity bitwise right-shifted by a shift value. The quantity is a difference of bvIntra[0] and nTbs. If cIdx is equal to 0, the shift value is 1. Otherwise, the shift value equals to SubWidthC. The quantity is then right-shifted, denoted by ">>", by the shift value minus 1.

The (nTbS)×(nTbS) array of the predicted samples, with x, y=0 . . . nTbS 1, can be derived as follows. The reference sample location (xRefCmp, yRefCmp) can be specified by Equation 15.

$$(xRefCmp, yRefCmp)=(xTbCmp+x+bv[0], yTbCmp+y+bv[1]) \quad \text{(Eq. 15)}$$

Each sample at the location (xRefCmp, yRefCmp) can be assigned to predSamples[x][y].

The physical transformation from the images of physical objects of the video source 108 to displaying the video stream 112 on pixel elements of the display interface 120 results in physical changes to the pixel elements of the display interface 120 in the physical world, such as changes of electrical states of the pixel elements, based on the operation of the video coding system 100. As the changes in the physical world occur, such as the motion of the objects captured in the video source 108, the movement itself creates additional information, such as updates to the video source 108, which are converted back into changes in the pixel elements of the display interface 120 for continued operation of the video coding system 100.

It has been found that the intra copy motion vector 808 pointing to the reference coding unit 806 within the search range 902 provides improved overall system performance. The improved overall system performance is provided because the search range 902 is restricted by the intra block copy process 802 such that it does not include any of the upper coding tree units 1008 and includes only the left coding tree unit 1018 and the current coding tree unit 1010. As such, the complexity of the search for the reference coding unit 806 is significantly reduced, thereby reducing execution time and thus increasing the overall system performance.

It has also been found that the current coding unit 804 not overlapping with the reference coding unit 806 provides improved quality of compression. The improved quality of compression is provided because the current coding unit 804 not overlapping with the reference coding unit 806 prevents the invalid motion vectors 904 that lead to the redundancy in the motion vector (MV) coding of the intra block copying prediction mode, which degrades the quality of compression.

Figure 12:
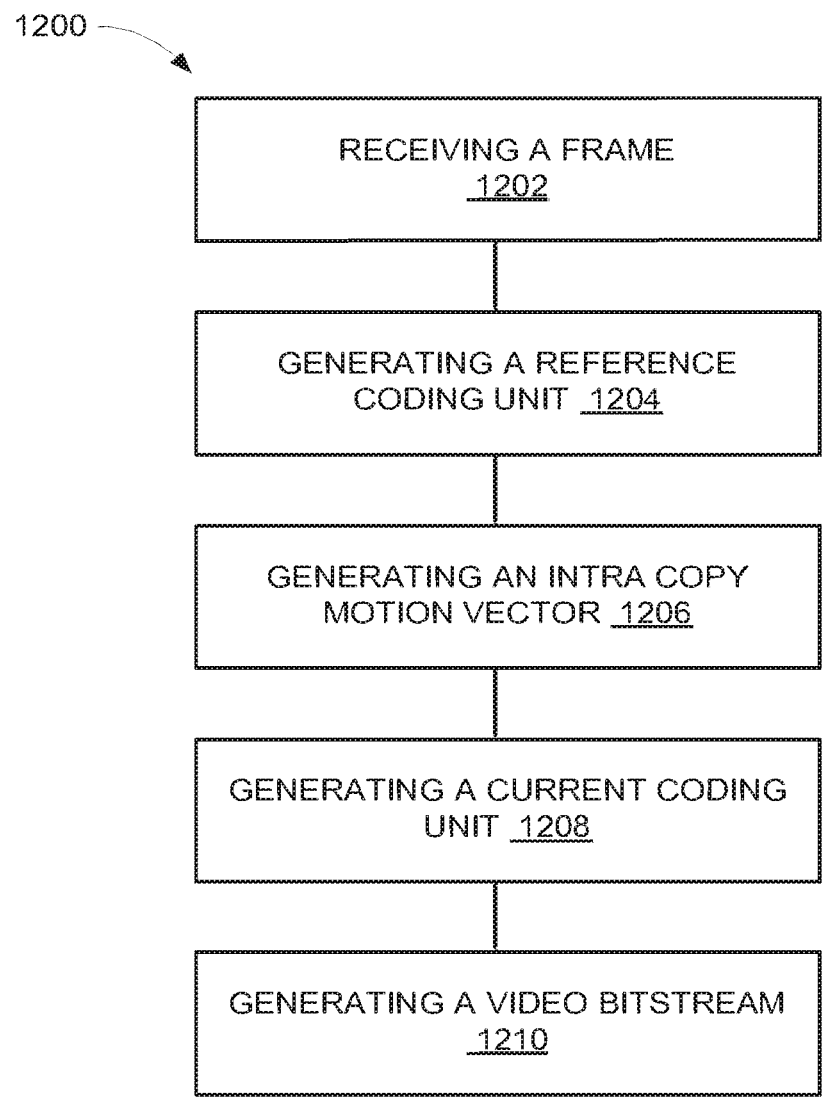
FIG. 12 is a flow chart of a method of operation of a video coding system in a further embodiment of the present invention.

Referring now to FIG. 12, therein is shown a flow chart of a method 1200 of operation of a video coding system in a further embodiment of the present invention. The method 1200 includes: receiving a frame from a video source in a block 1202; generating a reference coding unit in the frame in a block 1204; generating an intra copy motion vector pointing to the reference coding unit within a search range, wherein the search range does not include an upper coding tree unit of the frame in a block 1206; generating a current coding unit based on the intra copy motion vector in a block 1208; and generating a video bitstream based on the current coding unit for a video decoder to receive and decode for displaying on a device in a block 1210.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the video coding system of the present invention furnishes important and heretofore unknown and unavailable solutions, capabilities, and functional aspects for efficiently coding and decoding video content. The resulting processes and configurations are straightforward, cost-effective, uncomplicated, highly versatile and effective, can be surprisingly and unobviously implemented by adapting known technologies, and are thus readily suited for efficiently and economically manufacturing video coding devices fully compatible with conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. An encoding device, comprising:
a circuitry configured to:
set a search range, based on a first absolute value of a horizontal component ($MV_x$) of a motion vector in an intra block copying mode and a second absolute value of a vertical component ($MV_y$) of the motion vector in the intra block copying mode,
wherein one of the first absolute value or the second absolute value is one of equal to or greater than a unit size value of a current coding unit (CU);
calculate an intra copy motion vector based on the set search range;
encode the current CU, based on the calculated intra copy motion vector; and
generate a bit stream based on the encoded current CU.

2. The encoding device according to claim 1, wherein the circuitry is further configured to set the search range, based on the $MV_x$ which is less than a width of the current CU and the second absolute value of $MV_y$ which is larger than a height of the current CU.

3. The encoding device according to claim 1, wherein the search range includes a current coding tree unit and a left coding tree unit.

4. The encoding device according to claim 1, wherein the search range excludes an upper coding tree unit within an upper coding unit row.

5. An encoding method, comprising:
in an encoding device:
setting a search range, based on a first absolute value of a horizontal component ($MV_x$) of a motion vector in an intra block copying mode and a second absolute value of a vertical component ($MV_y$) of the motion vector in the intra block copying mode,
wherein one of the first absolute value or the second absolute value is one of equal to or greater than a unit size value of a current coding unit (CU);
calculating an intra copy motion vector based on the set search range;
encoding the current CU, based on the calculated intra copy motion vector; and
generating a bit stream based on the encoded current CU.

6. The encoding method according to claim 5, further comprises setting the search range, based on the $MV_x$ which is less than a width of the current CU and the second absolute value of $MV_y$ which is larger than a height of the current CU.

7. The encoding method according to claim 5, wherein the search range includes a current coding tree unit and a left coding tree unit.

8. The encoding method according to claim 5, wherein the search range excludes an upper coding tree unit within an upper coding unit row.

* * * * *